Figure 1:
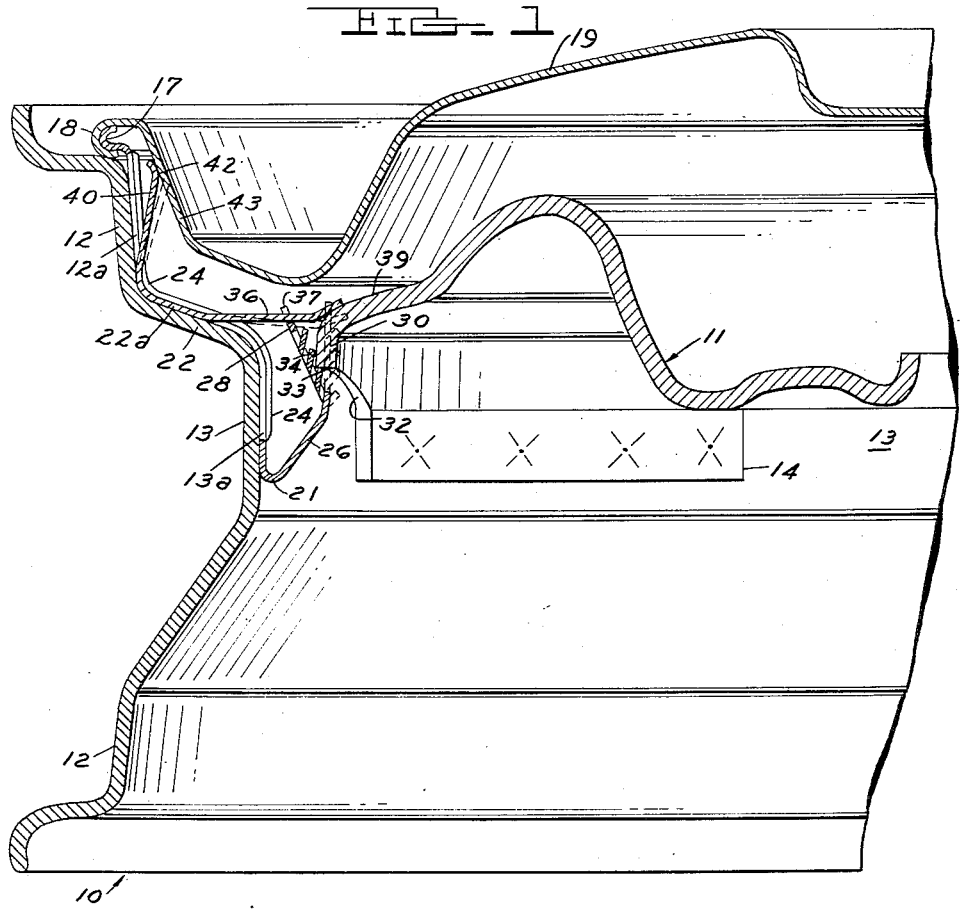

March 18, 1958   C. P. CHAMBERLIN   2,827,332
CLIP FOR ATTACHING ORNAMENTAL MEMBERS TO VEHICLE WHEELS
Filed Jan. 17, 1955

INVENTOR.
CLARENCE P. CHAMBERLIN
BY
Farley Forster & Farley
ATTORNEYS

United States Patent Office 2,827,332
Patented Mar. 18, 1958

2,827,332

CLIP FOR ATTACHING ORNAMENTAL MEMBERS TO VEHICLE WHEELS

Clarence P. Chamberlin, Bloomfield Hills, Mich., assignor to Metal Mouldings Corporation, Detroit, Mich., a corporation of Michigan Application January 17, 1955, Serial No. 482,053

15 Claims. (Cl. 301—37)

This invention relates to an improved construction for a clip which can be placed in interlocking engagement with the structure of a vehicle wheel for detachably securing an ornamental member thereto. Such ornamental members, which are employed to embellish all or part of a wheel, will be generally referred to as "covers."

A great many constructions have been proposed for detachably securing an ornamental cover member to a wheel. As a general rule a gripping engagement between the member and wheel is provided in these constructions either by reason of the resiliency of the material of which the cover member is made, and/or the resiliency of a clip member secured to the cover or to the wheel structure by some positive means of fastening such as a rivet, bolt or weld. These constructions have certain disadvantages. If the resiliency of the cover is relied upon, the cover must be made from some alloy steel having resilient properties sufficient for gripping, snap-on engagement. The use of such material adds to the cost of the part as compared with cheaper materials which would otherwise be entirely suited for use in a member whose function is ornamental. If a clip element is used in the construction which is positively fastened to the cover or the wheel, the manufacturing and/or installation expense is thereby affected.

The principal object of the present invention is to provide a clip, relatively simple in construction, which can be secured to a wheel structure with a positive interlock, and with this interlocking relationship being obtained by merely slipping the clip into proper position on the wheel. I am aware that clips of this general nature have been proposed in the past, but to my knowledge these have not found commercial acceptance, probably due to the fact that such prior constructions did not result in the obtaining of a positive interlock with the wheel structure, but instead obtained only a frictional type of gripping engagement therewith.

The clip of the present invention is made with a certain amount of resiliency so that a wheel cover can be attached to it with a snap-on type of engagement without providing gripping resiliency in the material of the cover; also, so that the interlocking engagement between the clip and the wheel structure can be released.

According to the present invention means are incorporated in the structure of the clip to counteract the resiliency that must be provided in the material thereof so that the clip will not become detached from the wheel or from the cover in normal service. The outer or cover engaging end of the clip is provided with a lip which is engageable with a bead formed on the cover much in the customary manner employed in constructions of this general type. This engagement is preferably augmented by the engagement between a tang forming part of the clip structure and a surface on the cover spaced from the bead thereof. The resulting dual points of contact act to maintain the clip properly and securely engaged with the cover, and also results in the cover acting to maintain the clip in proper position on the vehicle wheel.

The other or wheel engaging end of the clip is provided with means for interlocking the clip with the body and rim parts of a wheel. This interlocking connection is also preferably augmented by a resilient tang forming part of the clip structure, which tang engages one of the wheel parts to maintain the clip in proper position for retention of the interlock, and also in proper position for the retention of its engagement with the cover.

Preferably, the clip is formed from a single blank of sheet material. The portion between its cover and wheel engaging ends is shaped for surface contact with the wheel rim, and this portion of the clip is made relatively rigid. The cover and wheel engaging tangs are struck from the blank and act to maintain the clip properly seated against the surface of the wheel rim, as well as to maintain the engagement between the clip and the cover and wheel. By reason of the functioning of these tangs as outlined above, both the wheel body and the cover member act to hold the clip in position on the wheel. In the case of the cover this action is complementary to the action of the clip in retaining the cover on the wheel.

Figure 2:
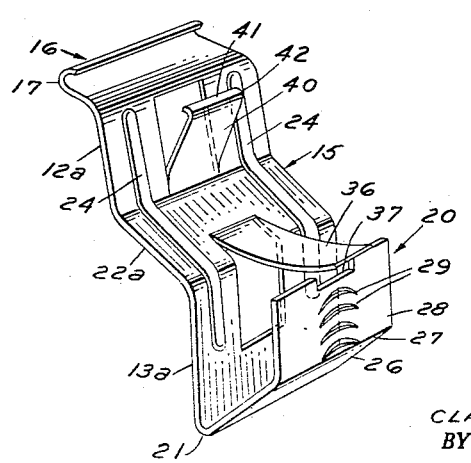

A presently preferred embodiment of the invention is disclosed in the accompanying drawing, which construction will now be described in detail in order that the features of the clip and the manner of its fabrication may be more fully understood. This drawing comprises the following views:

Fig. 1, a sectional elevation through a portion of a vehicle wheel of conventional design showing the clip of the invention attached thereto for the purpose of holding a cover member thereon; and Fig. 2, a perspective view of the clip shown sectionally in Fig. 1, the section of Fig. 1 being taken approximately through the longitudinal center of the clip.

The automobile wheel structure shown in Fig. 1 consists of two main parts, a rim 10 and a body 11. The rim is formed with tire bead flanges 12 and a center or drop flange 13, and the body 11 is provided with a number of circumferentially spaced tabs, such as the one 14 shown, which are welded to the drop center flange 13 of the rim, thus attaching the wheel body 11 to the rim 10 along a number of spaced circumferential areas. Between these areas of attachment between the rim and body are a number of apertures, the tabs 14 being similar to the outer ends of wheel spokes.

The clip of the invention, which is generally designated by the reference 15 (Fig. 2), is designed to be formed from a single blank of material. One end 16 of this blank is bent back to form a rounded lip 17 for engagement by a bead 18 (Fig. 1) formed around the periphery of a cover member 19. This end of the clip will be referred to, therefore, as the cover engaging end.

The other end 20 of the blank is bent back at 21 to form a U-shaped configuration which engages the wheel parts, and thus will be referred to generally as the wheel engaging end of the clip.

That portion of the clip intermediate the cover engaging end and the U-shaped bend 21 will be referred to as the main portion or body of the clip. This main portion or clip body is shaped for nested or surface-to-surface engagement with the wheel rim, having portions 12a and 13a which seat against the tire bead and drop center flanges, respectively, of the rim and an intermediate portion 22a which engages the corresponding surface 22 of the wheel rim in between these flanges thereof. Stiffening ribs 24 are pressed into the body portion of the clip, to make it relatively rigid so that the shape of this portion of the clip will not become distorted during installation or in service, but instead will be stabilized in order that none of the surface-to-surface contact between the clip and wheel rim will be lost.

Resiliency or flexure in the clip structure is thus principally confined to the wheel engaging end 20 thereof. The U-shaped configuration of the wheel engaging end 20 of the clip is made up of a portion 26, extending at an acute angle to the clip body from the bend 21 therein, and bent along the line 27 to form a terminal portion 28 which extends approximately parallel to the portion 13a of the clip body when in its free position as shown in Fig. 2. A number of outwardly projecting serrations or lips 29 are formed along the face of the terminal portion 28, and when the clip is installed on a wheel, as shown in Fig. 1, these serrations 29 engage the outer flange 30 of the wheel body 11.

A comparison of Figs. 2 and 1 will show that when the clip has been inserted into the aperture between the rim and body parts of the wheel, the terminal portion 28 of the clip has been bent or displaced considerably from its free position of substantial parallelism with the clip body and is inclined towards the clip body. As a result an interlocking engagement is created between the serrations 29 and the wheel body along a pair of angularly disposed surfaces—the axially extending outer surface of the wheel body flange 30, and the radially extending surface 32 at the end of that flange. The radially extending surface 32 is engaged by the end 33 of one of the serrations, while the axially extending wheel body flange surface 30 is engaged by the face 34 of an adjacent serration. Most of the distortion or flexure in this displacement of the portion 28 of the clip takes place along the line 27 or bend, between the portions 26 and 28 of the clip.

When a wheel cover 19 is installed by being snapped into place over three or four of the clips, the design and configuration of the clip permits the necessary flexure to take place along the bend 21 as well as the bend 27. It is to be noted that this flexure area is as remote as possible from the lip 17 which engages the cover and therefore a minimum amount of actual deflection of the clip structure is required in order to produce a snap-on engagement. Consequently, all the necessary flexure for such snap-on engagement can be built into the structure of the clip without fear of any permanent distortion of the clip as a result of the snap-on engagement or installation of a wheel cover. The need for resiliency or deflection in the cover construction is eliminated, and therefore, relatively inflexible, cheaper materials can be employed for the ornamental cover member.

The preferred clip construction shown incorporates additional means which positively urge and position the body of the clip against the surface of the wheel rim. These means comprise first a wheel engaging tang 36 struck from the body of the clip in overlapping relation with the terminal portion 28 of the U-shaped wheel engaging end 20 thereof, which is provided with a notch 37 along the overlapping area. The end of this tang extends over and beyond the portion 28 of the clip even in the free position thereof (see Fig. 2). Tang 36 has a curved resilient shape and, when the clip is installed on a wheel as shown in Fig. 1, is adapted to engage the outer radial surface 39 of the wheel body, the tang being displaced from its free dotted line position as a result of this engagement. The simultaneous or accompanying displacement of the terminal portion 28 of the clip from its free to its engaged position is preferably such as to place the tang 36 between the sides of the notch 37 in the terminal portion as shown in Fig. 1, so that these parts act to mutually stabilize each other in engaged position. Seating of the tang 36 against the radial surface 39 of the wheel body places the tang under stress and acts to force the clip body into firm engagement with the wheel rim. When the clip is flexed away from the wheel rim, by the act of installing a wheel cover, the tang 36 thus assists in positively returning the clip to a properly seated position thereon.

The positioning means additionally comprise a second or cover engaging tang 40 struck from the clip blank along the portion 12a thereof, with the free end 41 of this tang extending towards the cover engaging end 16 of the clip. Tang 40 is also resilient with respect to the clip body and is provided with a rounded cover engaging surface 42 which is disposed oppositely, in a radial direction on the wheel, to the cover engaging lip 17 of the clip. When a cover, having the configuration of the cover 19 shown, is installed on the clip, the tang 40 is engaged by a generally axially extending portion 43 of the cover. This engagement displaces the tang 40 from its free position, as shown in dotted line, stressing the tang and thereby causing the clip to be urged into firm seated engagement with the wheel rim, as a result of its engagement with the cover. The tang 40 also acts to retain the cover engaging end of the clip seated in the bead 18 of the cover.

Wheel engaging tang 36, when stressed, augments the engagement between a serration 29 of the clip and the wheel body, and creates an engagement of the clip between the spaced, radially disposed surfaces 32 and 39 of the wheel body. Wheel engaging tang 36 also acts to maintain the clip body firmly seated against the surface of the wheel rim, and additionally acts to urge the clip body in a direction of firm engagement with a wheel cover.

Cover engaging tang 40 augments the engagement of the cover engaging lip 17 of the clip with the cover, since it creates contact between the clip and cover along oppositely disposed surfaces. Cover engaging tang 40 also causes the cover to maintain the clip in properly seated engagement with the surfaces of the wheel rim.

The use of these tangs, particularly the cover engaging tang 40, is to be considered an optional feature of the present invention, because an engagement between tang 40 and the wheel cover depends upon the configuration given to the latter, which in turn may be varied considerably from that shown for reasons of styling. Proper operation of the clip for the performance of its intended function can be obtained without the use of this tang, and also without the use of the wheel engaging tang. It is considered preferable, however, to employ these tangs wherever possible due to the severe conditions under which a device of this type is subjected in operation. Stresses and forces resulting from wheel rotation and road shocks at high speeds are very great and very complex, and therefore it is considered advisable to employ any and all means which act to maintain the clip in properly seated position.

With the present construction it is to be noted that the engagement between the clip and the wheel is not purely a frictional one, but is one which utilizes a positive interlock, created between the clip and the wheel by the engagement of a serration 29 of the clip with the radial extending surface 32 of the wheel body flange 30. The deflection of the terminal portion 28, and portion 26 of the clip which accompanies this interlock also produces a frictional engagement between the clip body and the wheel rim over a large area of surface contact. The clip body construction is such as to stabilize and insure this large area of surface contact being maintained due to the fact that the clip structure is made rigid along the area of surface contact by the stiffening ribs 24.

The constructional features outlined herein result in: (1), a clip which has the advantage of being formable from a single blank of material by simple stamping operations; (2), a clip which possesses enough resiliency for the creation of a snap-on engagement with a relatively inflexible cover member, and which engagement is created or accompanied by a minimum amount of deflection of the clip structure and hence a minimum possibility of distortion thereof; (3), a clip which can be simply slipped into position on a wheel into positive interlocking relation with the wheel structure, this interlocking relation being augmented by a frictional surface-to-surface engagement between the clip and wheel parts; (4), a clip wherein means can be incorporated for augmenting the interlock and frictional engagement between the clip and wheel by contact between the clip and wheel along surfaces disposed oppositely with respect to the interlocking surfaces; and (5), a clip wherein means can be incorporated for augmenting the engagement between the clip and wheel cover and which also results in the cover acting to augment the frictional engagement between the clip and the wheel.

With the foregoing features and advantages of the invention in mind, it should be possible for those skilled in the art to employ these principles and features for the construction of clips according to the invention in forms other than that specifically shown therein, as may be necessary from time-to-time in order to adapt the invention for use with specific wheel structures and specific cover contours. Accordingly, it is intended that the invention not be limited other than as required by the terms of the following claims, taken in conjunction with the foregoing description.

I claim:

1. A wheel cover attaching clip of the type which can be detachably secured between the rim and body parts of a vehicle wheel, said clip comprising a cover engaging end, a wheel engaging end, and a portion intermediate said ends, said intermediate portion being shaped for surface contact with a portion of the radially inner side of the wheel rim, said wheel engaging end comprising a U-shaped extension of said intermediate portion flexible relative thereto and having one surface adapted for engagement with an axially extending surface on the radially outer side of the wheel body, and said wheel engaging end having a second surface engageable with a radially disposed surface of said wheel body, said U-shaped portion being dimensioned so as to be deflected from its free position in a direction toward said intermediate portion of the clip as a result of said engagement.

2. A wheel cover attaching clip of the type adapted to be engaged between the rim and body parts of a vehicle wheel, said clip comprising a main portion shaped to a configuration corresponding to that of a portion of the radially inner side of the wheel rim for surface contact therewith, means provided at one end of said main portion of said clip for snap-on engagement with a cover member, and a wheel body engaging portion provided at the other end of said clip, said body engaging portion being bent back on the main portion of said clip in a generally U-shape and being flexible relative to said main portion, said body portion being additionally provided with a series of serrations for interlocking engagement with a pair of angularly disposed surfaces of said wheel body.

3. A clip as defined in claim 2 further characterized by stiffening means for preventing deflection of the main portion thereof.

4. A wheel cover attaching clip adapted to be detachably interlocked with the rim and body parts of a vehicle wheel, said clip comprising a body portion shaped for surface contact with one of said wheel parts, means provided at one end of said body portion for engaging a cover member, the other end of said body portion being bent back thereon to form a wheel engaging end relatively resilient to said body portion, and means carried by said wheel engaging end for interlocking engagement with a pair of angularly disposed surfaces on the other of said wheel parts.

5. A clip as defined in claim 4 wherein said means carried by the U-shaped wheel engaging end of the clip for interlocking engagement with a pair of angularly disposed surfaces on the other of said wheel parts comprise a series of serrations projecting outwardly from said U-shaped wheel engaging end to form a series of angularly disposed surfaces on said clip for selective interlocking engagement with said pair of angularly disposed surfaces on said other wheel part.

6. A clip construction according to claim 4 further characterized by said clip body portion being provided with a tang projecting outwardly therefrom and overlapping the wheel engaging end of said clip, said tang being relatively resilient to said body portion and adapted for engagement with a third surface of the wheel part engaged by said interlocking means.

7. A clip construction according to claim 6 wherein the wheel engaging end of said clip is provided with a notch adapted to receive said tang.

8. A clip construction according to claim 4 further characterized by said cover engaging means including a tang extending from said clip body portion toward the cover engaging end thereof, and in spaced opposing relationship therewith.

9. A wheel cover attaching clip formed of sheet metal, said clip comprising a body portion of relatively rigid construction shaped for surface-to-surface contact with a wheel part, wheel cover engaging means provided at one end of said body portion, and means for engaging a second wheel part provided at the other end thereof, said wheel part engaging means comprising a U-shaped section bent back on said body portion and having a terminal portion resilient relative to said body and being provided with means for engaging a pair of angularly disposed surfaces of said second wheel part.

10. A wheel cover attaching clip adapted to be detachably interlocked with the rim and body parts of a vehicle wheel, said clip having a body portion shaped for surface contact with a portion of the radially inner side of the wheel rim, a U-shaped wheel engaging end forming a continuation of said body and bent back thereon, said U-shaped end being resilient relative to said body and having a terminal portion provided with means for engaging a pair of adjacent angularly disposed surfaces of said wheel body, said surfaces being disposed in radial and axial relation to the center of the vehicle wheel, and a tang projecting from the clip body and relatively resilient thereto, the end of said tang being positioned adjacent said terminal portion and adapted for engagement with a third surface on the wheel body, said third surface being disposed generally radially and being axially opposed to the first mentioned radial surface of said wheel body.

11. In combination, a vehicle wheel having rim and body parts, a cover member provided with a relatively inflexible bead thereon and a clip detachably secured to said wheel, said clip having a body portion shaped for surface contact with said wheel rim, said body portion being of relatively rigid construction, means for engaging said cover bead provided at one end of said clip body, and wheel engaging means provided at the other end of said body, said wheel engaging means being resilient relative to said body and provided with means for interlocking engagement with the wheel body part, the other end of said clip body being provided with means for snap-on engagement with said cover bead, said snap-on engagement being accompanied by flexure of said clip body relative to the wheel engaging end portion thereof.

12. The combination set forth in claim 11 wherein the cover member is provided with a generally axially extending surface disposed oppositely and in spaced relationship with said cover bead, and wherein the cover engaging means of said clip includes a resilient tang projecting from the body portion thereof toward the cover engaging end thereof, said tang engaging said axially extending cover surface whereby said clip and cover are restrained against relative movement in both a radially outward and radially inward direction.

13. The combination set forth in claim 11 wherein the wheel engaging means of said clip additionally comprise a tang projecting from the body portion of the clip into engagement with the wheel body part, said tang acting to normally urge the body portion of the clip into contact with the wheel rim and the wheel engaging means into contact with the wheel body part.

14. A wheel cover attaching clip adapted to be detachably interlocked with the rim and body parts of the vehicle wheel, said clip having a body portion shaped for surface contact with a portion of the radially inner side of the wheel rim, a U-shaped wheel engaging end forming a continuation of said body portion and bent back thereon said U-shaped end being resilient relative to said body portion and having a terminal portion provided with means for engaging a pair of adjacent angularly disposed surfaces of said wheel body.

15. A wheel cover ataching clip adapted to be detachably interlocked with the rim and body parts of the vehicle wheel, said clip having a body portion shaped for surface contact with a portion of the radially inner side of the wheel rim, a U-shaped wheel engaging end forming a continuation of said body portion and bent back thereon, said U-shaped end being resilient relative to said body portion and having a terminal portion provided with means for engaging a pair of adjacent angularly disposed surfaces of said wheel body and a tang projecting from the clip body portion and relatively resilient thereto, the end of said tang being positioned adjacent to said terminal portion and adapted for engagement with a third surface on the wheel body.

References Cited in the file of this patent

UNITED STATES PATENTS

| | | |
|---|---|---|
| 2,239,367 | Lyon | Apr. 22, 1941 |
| 2,304,583 | Lyon | Dec. 8, 1942 |
| 2,497,896 | Lyon | Feb. 21, 1950 |
| 2,561,160 | Weasler | July 17, 1951 |
| 2,605,530 | Slemmons | Aug. 5, 1952 |